(12) United States Patent
Santosuosso et al.

(10) Patent No.: US 10,768,917 B2
(45) Date of Patent: Sep. 8, 2020

(54) DYNAMIC DEPLOYMENT PLACEMENT OF PROCESSING ELEMENTS IN A STREAMING DATA SYSTEM

(71) Applicant: International Business Machines Corporation, Armonk, NY (US)

(72) Inventors: John M. Santosuosso, Rochester, MN (US); Eric L. Barsness, Pine Island, MN (US); Daniel Beuch, Rochester, MN (US); Michael J. Branson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/222,665

(22) Filed: Dec. 17, 2018

(65) Prior Publication Data

US 2020/0192650 A1    Jun. 18, 2020

(51) Int. Cl.
  *G06F 8/60*       (2018.01)
  *H04L 29/08*      (2006.01)

(52) U.S. Cl.
  CPC ............. *G06F 8/60* (2013.01); *H04L 67/34* (2013.01)

(58) Field of Classification Search
  CPC ...................................................... G06F 8/60
  USPC ...................................................... 717/177
  See application file for complete search history.

(56) References Cited

U.S. PATENT DOCUMENTS

| | | | |
|---|---|---|---|
| 8,601,458 B2 * | 12/2013 | Andrade | G06F 8/44 717/155 |
| 9,262,222 B2 * | 2/2016 | Branson | G06F 9/5011 |
| 9,405,553 B2 | 8/2016 | Branson et al. | |
| 9,459,757 B1 * | 10/2016 | Barsness | G06F 9/5005 |
| 9,535,763 B1 | 1/2017 | Cook et al. | |
| 2007/0261041 A1 | 11/2007 | Amini et al. | |
| 2009/0319687 A1 | 12/2009 | Goldstein et al. | |

(Continued)

OTHER PUBLICATIONS

Liu et al.; "Performance-Oriented Deployment of Streaming Applications on Cloud"; IEEE Transactions on Big Data; Jun. 29, 2017 (Year: 2017).*

(Continued)

*Primary Examiner* — Wei Y Zhen
*Assistant Examiner* — Clint Thatcher
(74) *Attorney, Agent, or Firm* — Patterson + Sheridan, LLP

(57) ABSTRACT

Systems, methods, and articles of manufacture are disclosed for processing element (PE) deployment placement in a streaming data system. In particular, PEs of a stream computing application are grouped across compute nodes in a dynamic manner that improves over manually specified groupings of PEs on particular compute nodes. A stream manager deploys PEs according to rules in deployment instructions specifying whether to collocate PEs on a single compute node and/or ex-collocate PEs across compute nodes based on dynamically-determined information relating to the PEs themselves, compute nodes on which PEs are to run, and/or the streams runtime. For example, the stream manager may profile code and deploy PEs on compute nodes based on such profiling, deploy PEs together on compute nodes meeting predefined system characteristics or streams runtime conditions or metrics, and/or deploy PEs on a compute node within a predefined proximity of an external source.

20 Claims, 12 Drawing Sheets

(56) References Cited

U.S. PATENT DOCUMENTS

2016/0094390 A1    3/2016   Sirianni et al.

OTHER PUBLICATIONS

Thilina Ashen Gamage; "Guide to Java Profilers"; Medium.com website [full url in ref.]; Sep. 10, 2018 (Year: 2018).*

Distributed UIMA Customizable Job Drivers Anonymously; IP.com No. IPCOM000224818D; Jan. 7, 2013.

"Avoiding Backpressure by Allowing Code Changes" Anonymously; IP.com No. IPCOM000248507D; Dec. 9, 2016.

"System and Method to Develop Case Management Applications on Workload Scheduler Platform," Anonymoously, IP.com No. IPCOM000247778D; Oct. 6, 2016.

Muthuvelu, N. et al, "A Dynamic Job Grouping-Based Scheduling for Deploying Applications with Fine-Grained Tasks on Global Grids," 2005.

* cited by examiner

DYNAMIC DEPLOYMENT PLACEMENT OF PROCESSING ELEMENTS IN A STREAMING DATA SYSTEM

BACKGROUND

Field of the Invention

The present invention relates generally to distributed computing, and more specifically, to dynamic deployment placement of processing elements in a streaming data system.

Description of the Related Art

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

According to one embodiment, a computer-implemented method is provided for deploying a distributed application including a plurality of processing elements. The method generally includes dynamically evaluating one or more of the processing elements by at least profiling an execution of the one or more of the processing elements. The method further includes determining one or more groupings of the processing elements on one or more compute nodes based, at least in part, on the dynamic evaluation and one or more rules. In addition, the method includes deploying the processing elements to the one or more compute nodes for execution based, at least in part, on the one or more groupings of the processing elements.

According to another embodiment, a computer-implemented method is provided for deploying a distributed application including a plurality of processing elements. The method generally includes dynamically evaluating at least one of a plurality of compute nodes on which the processing elements can run or a runtime environment. The method further includes determining one or more groupings of the processing elements on one or more of the compute nodes based, at least in part, on the dynamic evaluation and one or more rules. In addition, the method includes deploying the processing elements for execution based, at least in part, on the one or more groupings of the processing elements.

Further embodiments include a computer system configured to carry out the above method, and a non-transitory computer-readable storage medium comprising instructions that cause the computer system to carry out the above method.

DETAILED DESCRIPTION

Figure 1:
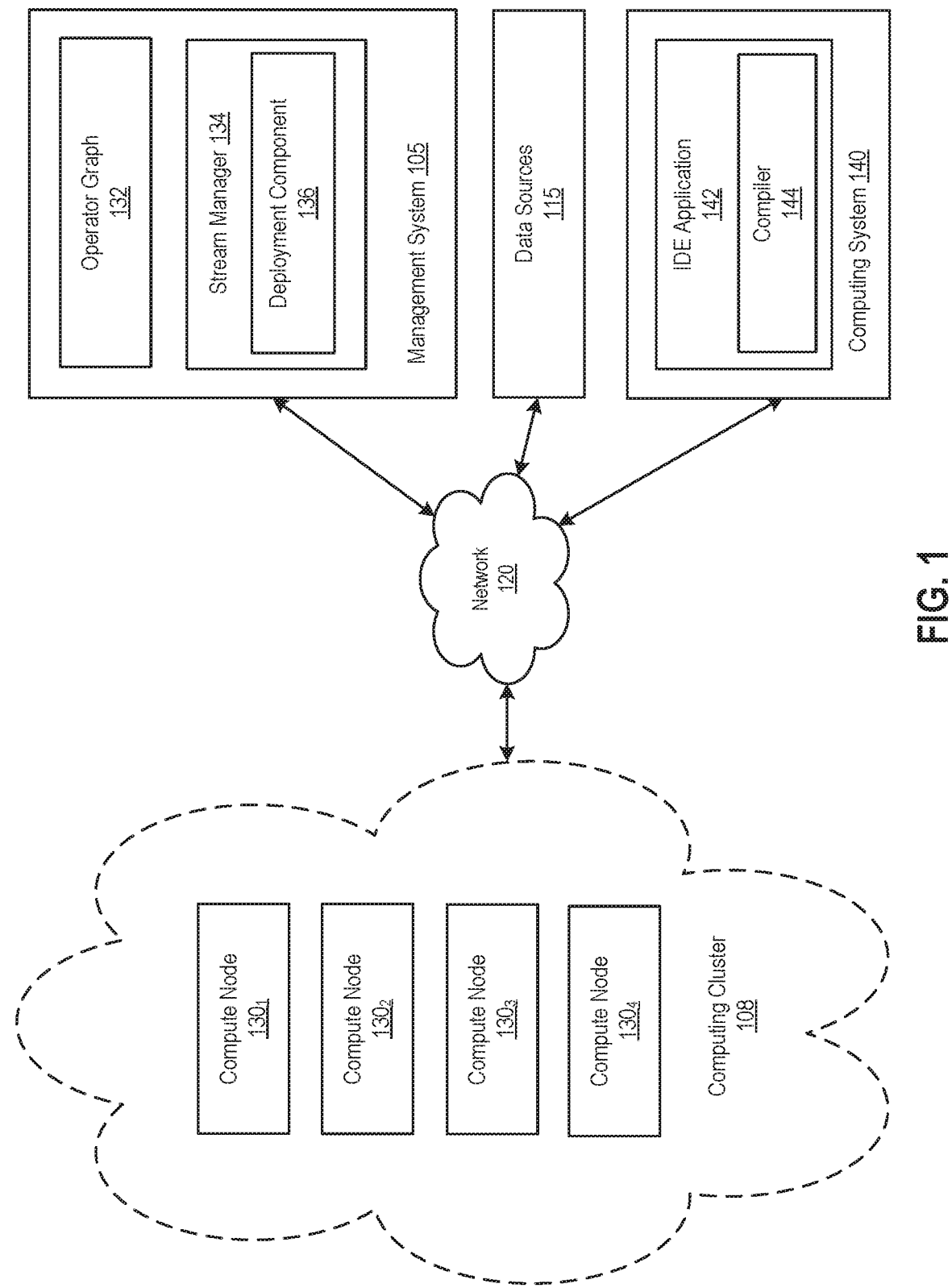
FIG. 1 illustrates a computing infrastructure configured to execute a stream computing application, according to an embodiment.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems, and processes to be developed, as well as present new challenges for application programmers and database developers.

In a stream computing application, operators are connected to one another such that data flows from one operator to the next (e.g., over a TCP/IP socket). Scalability is achieved by distributing an application across nodes by creating executables, also referred to herein as processing elements (PEs), as well as deploying the PEs on multiple nodes and load balancing among them. By default, each operator in a stream computing application may execute as a single PE. Multiple operators (or PEs) can also be fused together to form a single PE that is executable. When operators (or PEs) are fused together in a PE, the fused operators can use more rapid communication techniques for passing data than the inter-process communication techniques (e.g., a TCP/IP socket) that would otherwise be used. Further, PEs can be inserted or removed dynamically from an operator graph representing the flow of data through the stream computing application.

When a stream computing application is broken up into PEs that are distributed across a cluster of compute nodes, it is beneficial to distribute the PEs so as to optimize performance. In embodiments disclosed herein, PEs are grouped across compute nodes in a dynamic manner, as opposed to requiring manually specified groupings of PEs on particular compute nodes. Although discussed herein primarily with respect to PEs, it should be understood that a PE is just a unit of code and techniques disclosed herein may generally be applied to group any code of a distributed application deployed across compute nodes, such as operators that are smaller units of code than PEs. In one embodiment, a stream manager deploys the executable code of a stream computing application according to associated instructions specifying whether to collocate PEs together on a single compute node and/or ex-collocate PEs across distinct compute nodes based on dynamically-determined information that is related to, and determined by evaluating, the PEs themselves, the compute nodes on which the PEs can run, and/or the streams runtime. For example, the instructions may require the stream manager to (1) profile the executable code and deploy PEs together or separately on compute node(s) based on such profiling; (2) deploy PEs together on compute node(s) that satisfy predefined system characteristics, such as having a minimum number of processors or amount of memory; (3) deploy PEs together on compute node(s) satisfying predefined streams runtime conditions or metrics, such as a compute node having less than a predefined number of PEs running thereon or a compute node running PEs that process less than a predefined tuple count or rate; and/or (4) deploy PEs together on compute node(s) that are within a predefined proximity of an external source, such as an oracle machine. Although collocation (i.e., deploying PEs on the same compute node) and ex-collocation (i.e., deploying PEs on the distinct compute node) are used herein as reference examples of how PEs can be grouped during deployment, in some embodiments the stream manager may group PEs by fusing multiple PEs into a single PE deployed on a compute node, or vice versa, in a dynamic manner similar to the collocation and ex-collocation of PEs discussed herein.

Although the following describes a distributed application of a streams processing environment as a reference example of an application executing in a cluster of computing nodes, where processing elements in each node perform some tasks that result in data being output to other processing elements, one of skill in the art will recognize that embodiments presented herein may be adapted to a variety of applications having processing elements that perform tasks and that can be deployed on compute nodes in a dynamic manner.

FIG. 1 illustrates a computing infrastructure configured to execute a stream computing application, according to an embodiment. As shown, the computing infrastructure 100 includes a computing cluster 108 comprising a number of compute nodes $130_{1-4}$, a management system 105, one or more communication data sources 115, and a computer system 140, which communicate via a network 120 (e.g., a local area network or the Internet).

Each of the compute nodes $130_{1-4}$—i.e., hosts—may be a physical computing system or a virtual computing instance executing in, e.g., a cloud computing environment. Although four compute nodes $130_{1-4}$ are shown for illustrative purposes, a computing cluster may generally include any number of compute nodes. The compute nodes $130_{1-4}$ are configured to execute PEs of a distributed stream computing application which retrieves input streams of data from various data sources 115, e.g., over the network 120 and analyzes the input streams in manageable data units called "tuples." Examples of retrieved data include message data, Extensible Markup Language (XML) documents, biometric data captured from individuals in real time, etc. Each tuple of data may include a list of attributes, and the PEs of a stream computing application executing on various compute nodes may each performs task(s) using a tuple as input and output another tuple that may itself be input into a subsequent PE. That is, each PE may execute as an independent process on a compute node, and tuples flow from PE to PE in the streams processing environment. The compute nodes $130_{1-4}$ may be communicatively coupled to each other using one or more communication devices that use a particular communication protocol (e.g., TCP/IP) to transfer data between the compute nodes $130_{1-4}$. In addition, the compute nodes $130_{1-4}$ may transfer data internally between PEs located on the same compute node 130. Although not shown, code of a stream computing application may also include configuration information specifying properties of the streams processing environment, such as properties describing on which compute node a given processing element is located, a specified flow of data between processing elements 205, address information of each node, identifiers for processing elements, and the like.

The management system 105 and the computing system 140 may each be a physical computing system or a virtual machine instance running in, e.g., a cloud environment. As shown, the management system 105 includes a stream manager 134 and an operator graph 132. The operator graph 132 represents a stream computing application beginning from one or more source operators through to one or more sink operators, as discussed in greater detail below. The flow from source operator(s) to sink operator(s) is also sometimes referred to as an execution path. The stream manager 134 may perform various functionalities, including deploying stream computing applications to, and monitor the running of those stream computing applications on, the compute nodes $130_{1-4}$. In embodiments disclosed herein, PEs of a stream computing applications are deployed (and redeployed) across compute nodes in a dynamic manner. Subsequent to such deployment, a stream computing application may be monitored by tracking metrics associated with its runtime, such as metrics associated with PEs of the stream computing application. In addition, the stream manager 134 may move PEs from one compute node 130 to another in order to, e.g., manage the processing loads of the compute nodes 130 in the computing infrastructure 100. Further, the stream manager 134 may control the stream computing application by inserting, removing, fusing, un-fusing, or otherwise modifying the PEs and operators (or what data tuples flow to the PEs) running on the compute nodes $130_{1-4}$. In one embodiment, the stream manager 134 may provide a container environment for components that perform the various functionalities described above, such as distinct components that deploy stream computing applications (and take down PEs when an associated stream computing application is terminated), monitor the execution of deployed applications, etc. One example of a stream computing application is IBM®'s InfoSphere® Streams (note that InfoSphere® is a trademark of International Business Machines Corporation, registered in many jurisdictions worldwide).

As shown, the computing system 140 includes an integrated development environment (IDE) application 142. A developer may use the IDE application 142 to write source code to configure a PE by, e.g., specifying a type of a particular PE (e.g., a source PE that reads extracted from a particular source or a functor PE that manipulates input data), a function of a given PE, which compute node executes a given PE, a flow of tuples between PEs, an operator graph, etc. In particular, the IDE application 142 may allow the developer to create customized PEs that perform specified tasks.

Illustratively, the IDE application 142 includes a compiler 146 (which may be distinct from the IDE application in alternative embodiments) that generates, based on source code written by the developer, executable code as well as associated instructions specifying how to deploy the executable code on the compute nodes $130_{1-4}$. For example, code written in the Streams Processing Language (SPL), which is a distributed data flow composition language used in IBM® Streams, is typically compiled to create a streams application bundle (SAB) file containing different files, one or more of which may include the compiled executable code and other file(s) which may include instructions on how to deploy the executable code for PEs in the operator graph. In such a case, the instructions for deploying an operator (which may become a PE or be fused with other operators in a PE) may be embedded in a markup language file, such as an XML-type file, associated with the operator, and a deployment component 136 of the stream manager 134 may read the file with instructions embedded therein and deploy the operator's code based on such instructions. The instructions themselves may indicate parameter values (e.g., a number of processors on each compute node, how busy CPUs on compute nodes are, etc.) that the deployment component 136 needs to query, as well as rules for placing PEs together or apart during the deployment of a stream computing application, among other things. In particular, the deployment component 136 may collocate PEs together on a single compute node and/or ex-collocate PEs across distinct compute nodes in a dynamic manner, as required by the instructions associated with the PEs' executable code and discussed in greater detail below.

Figure 2:
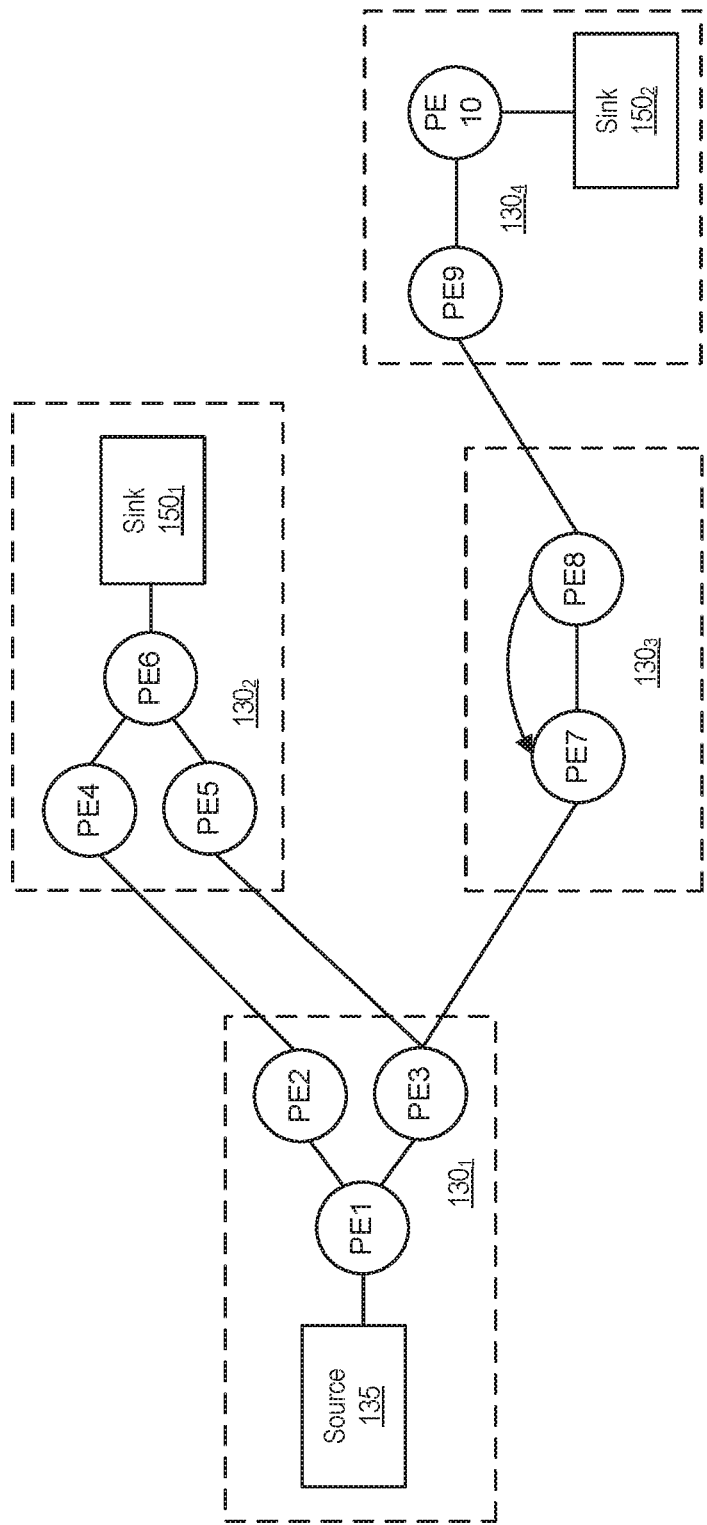
FIG. 2 illustrates an example operator graph, according to an embodiment.

FIG. 2 illustrates an example operator graph that includes ten processing elements (labeled as PE1-PE10) running on the compute nodes $130_{1-4}$. A processing element is composed of one operator running as, or multiple operators fused together into, an independently running process with its own process ID (PID) and memory space. Although FIG. 2 is abstracted to show connected PEs, the operator graph 132 may comprise of data flows between operators within the same PE or different PEs. Typically, processing elements receive an N-tuple of data attributes from the stream as well as emit an N-tuple of data attributes into the stream (except for a sink operator where the stream terminates or a source operator where the stream begins). It should be noted that the N-tuple received by a processing element need not be the same N-tuple sent downstream. Additionally, PEs may be configured to receive or emit tuples in other formats (e.g., the PEs or operators could exchange data marked up as XML, documents). Furthermore, each operator within a PE may be configured to carry out any form of data processing functions on the received tuple, including, for example, writing to database tables or performing other database operations such as data joins, splits, reads, etc., as well as performing other data analytic functions or operations.

As shown, the operator graph begins at a source 135 (that flows into the processing element labeled PE1) and ends at sinks $150_{1-2}$ (that flow from the processing elements labeled as PE6 and PE10, respectively). The compute node $130_1$ includes the processing elements PE1, PE2, and PE3. The source 135 flows into the processing element PE1, which in turn emits tuples that are received by PE2 and PE3. For example, PE1 may split data attributes received in a tuple and pass some data attributes to PE2, while passing other data attributes to PE3. Data that flows to PE2 is processed by the operators contained in PE2, and the resulting tuples are then emitted to PE4 on the compute node $130_2$. Likewise, the data tuples emitted by PE4 flow to the sink PE6 $140_1$. Similarly, data tuples flowing from PE3 to PE5 also reach the sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on the compute node $130_3$, which itself shows data tuples flowing to PE8 and looping back to PE7. Data tuples emitted from PE8 flow to PE9 on the compute node $130_4$, which in turn emits tuples to be processed by sink PE10 $140_2$.

Because a PE includes one or more (fused) operators, it is equally correct to describe the operator graph as execution paths between specific operators, which may include execution paths to different operators within the same processing element. FIG. 2 illustrates execution paths between processing elements for the sake of clarity.

Figure 3:
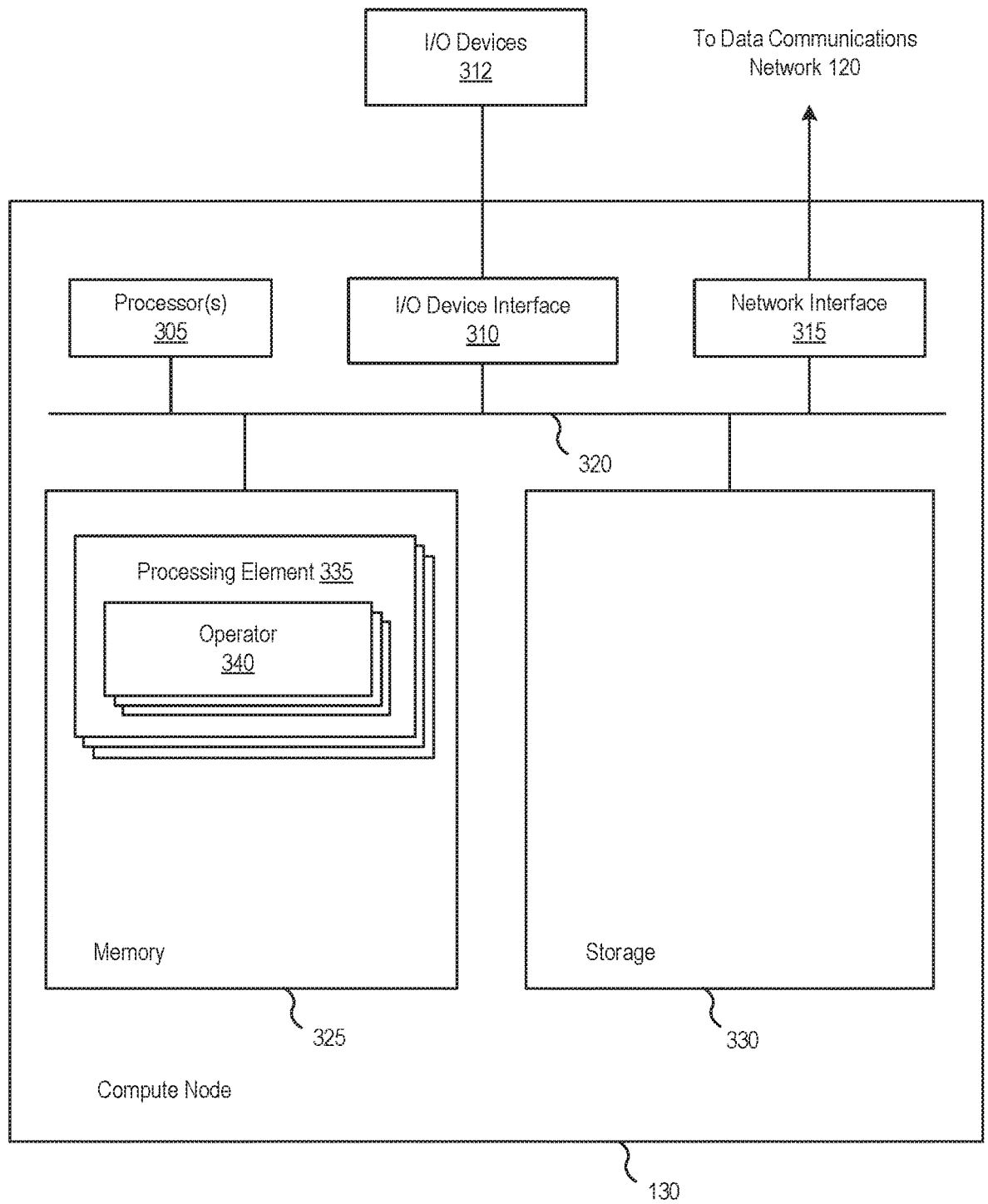
FIG. 3 is a more detailed view of a compute node in the computing infrastructure of FIG. 1, according an embodiment.

FIG. 3 is a more detailed view of one of the compute nodes 130 of FIG. 1, according an embodiment. As shown, the compute node 130 includes, without limitation, at least one processor 305, a network interface 315, an interconnect 320, a memory 325, and storage 330. The compute node 130 may also include an I/O devices interface 310 used to connect I/O devices 312 (e.g., keyboard, display and mouse devices) to the compute node 130.

Each processor(s) 305 retrieve and execute programming instructions stored in the memory 325. Similarly, the processor(s) 305 store and retrieve application data residing in the memory 325. The interconnect 220 is used to transmit programming instructions and application data between each of the processor(s) 305, I/O devices interface 310, storage 330, network interface 315, and memory 325. Processor(s) 305 are included to be representative of a single CPU, multiple CPUs, a single CPU having multiple processing cores, and the like. In one embodiment, a PE 335 is assigned to be executed by only one of the processor(s) 305, although in other embodiments the operators 340 of a PE 335 may comprise one or more threads that are executed on a plurality of the processor(s) 305. The memory 325 is generally included to be representative of a random access memory (e.g., DRAM or Flash). Storage 330, such as a hard disk drive, solid state device (SSD), or flash memory storage drive, may store non-volatile data.

In this example, the memory 325 includes a plurality of processing elements 335. Each PE 335 includes a single operator or a collection of operators 340 that are fused together. As noted above, each operator 340 may provide a small chunk of code configured to process data flowing into a processing element (e.g., PE 335) and to emit data to other operators 340 in the same PE or to other PEs in the stream computing application. Such PEs may be on the same compute node 130 or on other compute nodes that are accessible via the communications network 120.

Figure 4:
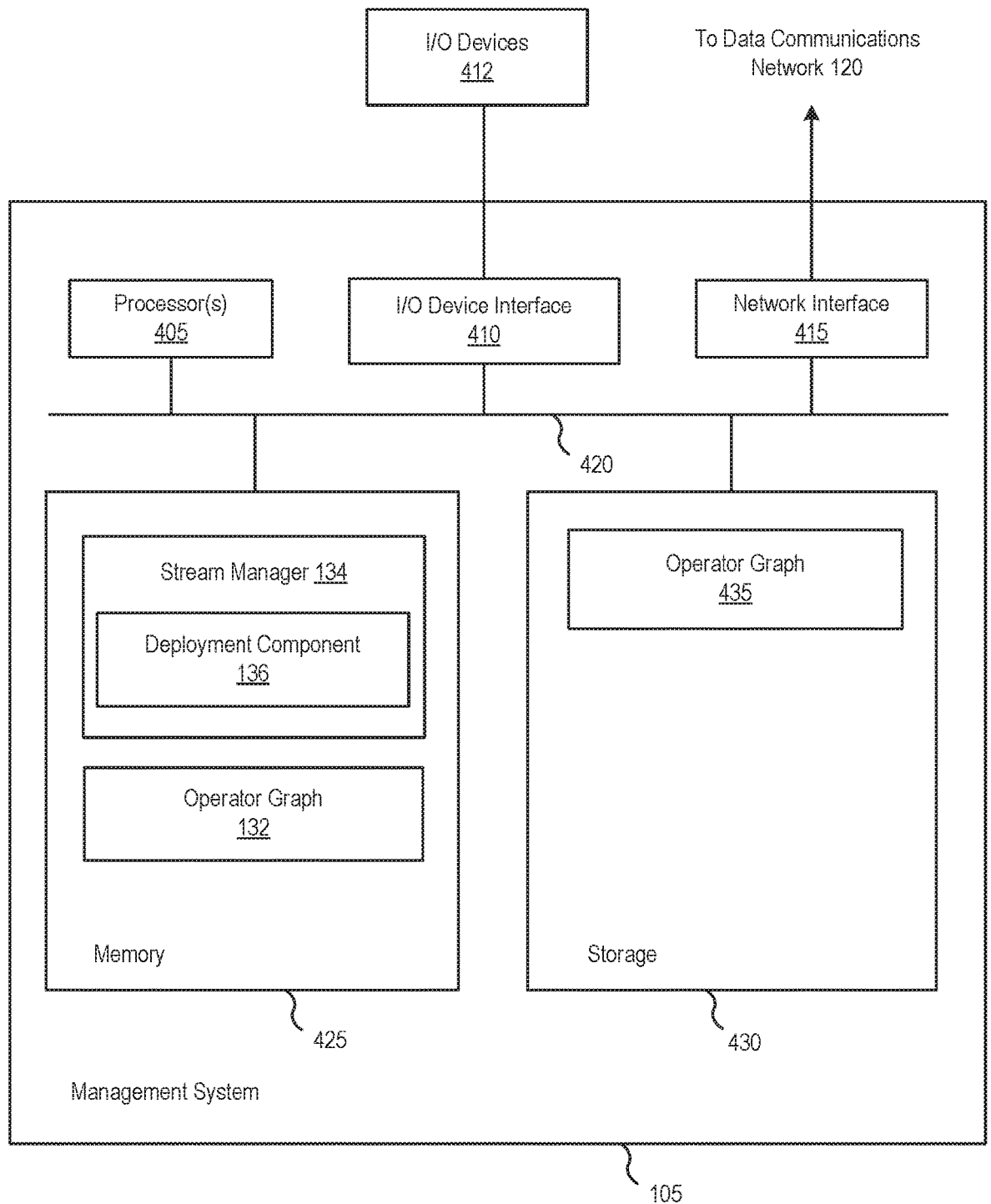
FIG. 4 is a more detailed view of a management system in the computing infrastructure of FIG. 1, according to an embodiment.

FIG. 4 is a more detailed view of the management system 105 of FIG. 1, according to an embodiment. As shown, the management system 105 includes, without limitation, processor(s) 405, a network interface 415, an interconnect 420, a memory 425, and storage 430. The management system 105 may also include an I/O device interface 410 connecting I/O devices 412 (e.g., keyboard, display and mouse devices) to the management system 105.

Like the processor(s) 305 of FIG. 3, the processor(s) 405 are configured to retrieve and execute programming instructions stored in the memory 425 and storage 430. Further, the processor(s) 405 are configured to store and retrieve application data residing in the memory 425 and storage 430. The interconnect 420 is configured to move data, such as programming instructions and application data, between the processor(s) 405, I/O devices interface 410, storage unit 430, network interface 405, and memory 425. Like the processor(s) 305, the processor(s) 405 are included to be representative of a single CPU, multiple CPUs, a single CPU having multiple processing cores, and the like. The memory 425 is generally included to be representative of a random access memory. The network interface 415 is configured to transmit data via the communications network 120. Although shown as a single unit, the storage 430 may be a combination of fixed and/or removable storage devices, such as fixed disc drives, removable memory cards, optical storage, SSD or flash memory devices, network attached storage (NAS), or connections to storage area-network (SAN) devices.

As shown, the memory 425 includes the stream manager 134 and the primary operator graph 132, which may be used to route tuples to PEs for processing. The stream manager 134 further includes the deployment component 136 that is configured to determine placements for PEs, and deploy (or redeploy) those PEs on compute nodes, in a dynamic manner, as discussed in greater detail below.

Figure 5:
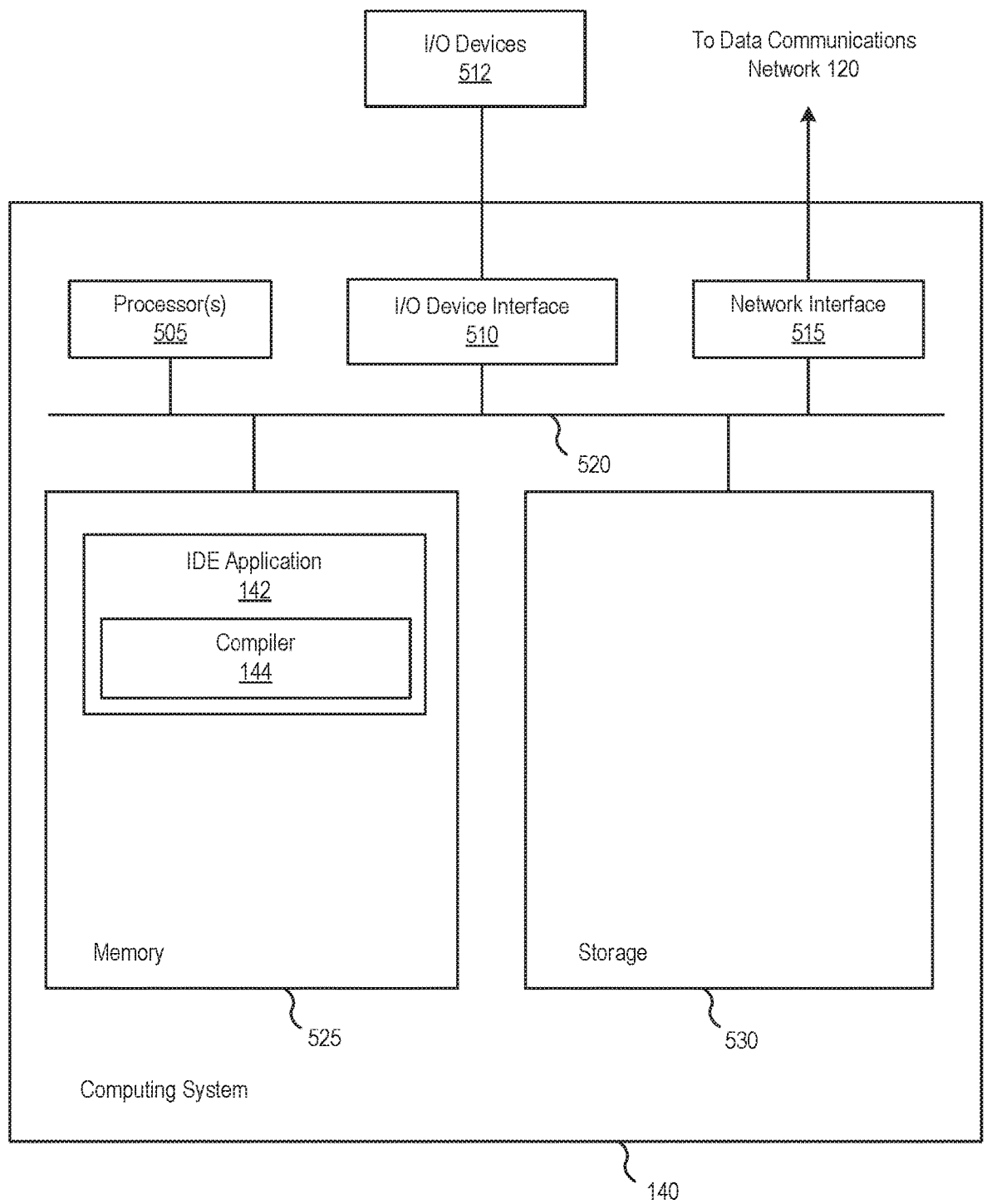
FIG. 5 is a more detailed view of a computing system in the computing infrastructure of FIG. 1, according an embodiment.

FIG. 5 is a more detailed view of the computing system 140 of FIG. 1, according an embodiment. As shown, the computing system 140 includes, without limitation, a processor(s) 505, a network interface 515, an interconnect 520, a memory 525, and storage 530. The computing system 140 may also include an I/O device interface 510 connecting I/O devices 512 (e.g., keyboard, display and mouse devices) to the computing system 140.

Like the processor(s) 305 of FIG. 3, the processor(s) 505 are configured to retrieve and execute programming instructions stored in the memory 525 and storage 530. Further, the processor(s) 505 is configured to store and retrieve application data residing in the memory 525 and storage 530. The interconnect 520 is configured to move data, such as programming instructions and application data, between the processor(s) 505, I/O devices interface 510, storage unit 530, network interface 505, and memory 525. Like the processor(s) 305, the processor(s) 505 are included to be representative of a single CPU, multiple CPUs, a single CPU having multiple processing cores, and the like. The memory 525 is generally included to be representative of a random access memory. The network interface 515 is configured to transmit data via the communications network 120. Although shown as a single unit, the storage 530 may be a combination of fixed and/or removable storage devices, such as fixed disc drives, removable memory cards, optical storage, SSD or flash memory devices, network attached storage (NAS), or connections to storage area-network (SAN) devices.

As shown, the memory 525 stores the IDE application 142 which includes a compiler 144. In one embodiment, the IDE application 142 permits a developer to write source code for a stream computing application, including the PEs thereof, that the compiler 144 is configured to compile into executable code and instructions including rules that specify how to deploy the executable code. In particular, the developer may add line(s) of code or a reference to a configuration file, and instructions may be generated therefrom, that cause PEs to be collocated and/or ex-collocated during deployment (or later re-deployment) in a dynamic manner, as discussed in greater detail below.

Figure 6A:
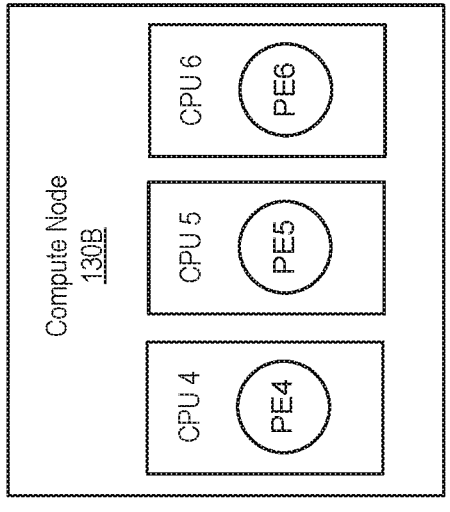
FIGS. 6A-E illustrate examples of determining processing element deployment placement in a dynamic manner, according to embodiments.
Figure 6A:
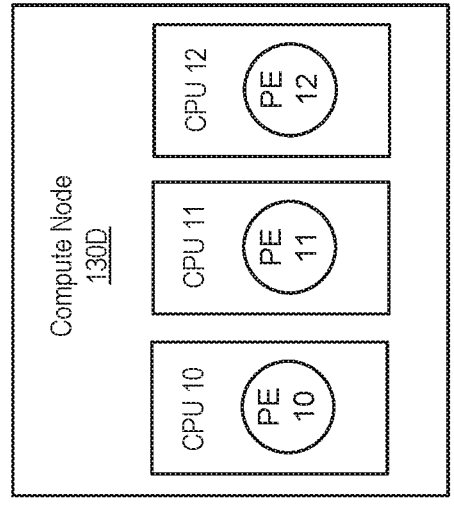
Figure 6A:
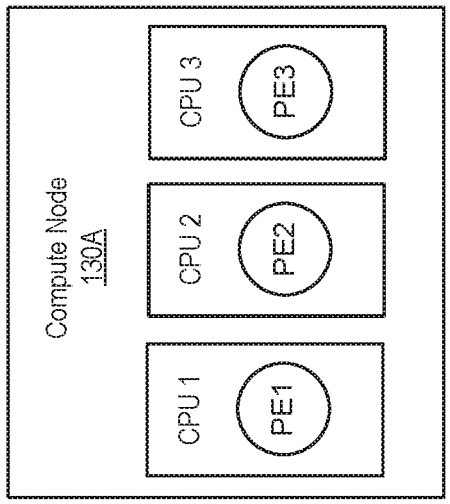
Figure 6A:
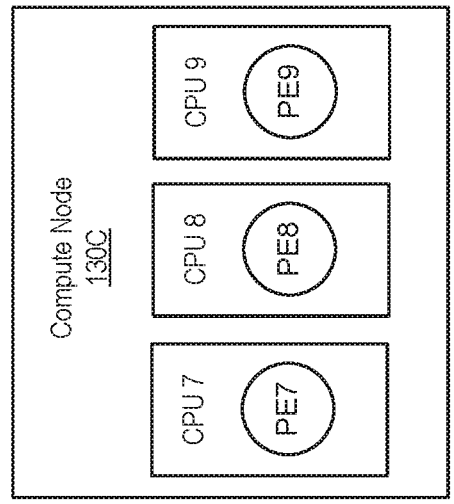
Figure 6B:
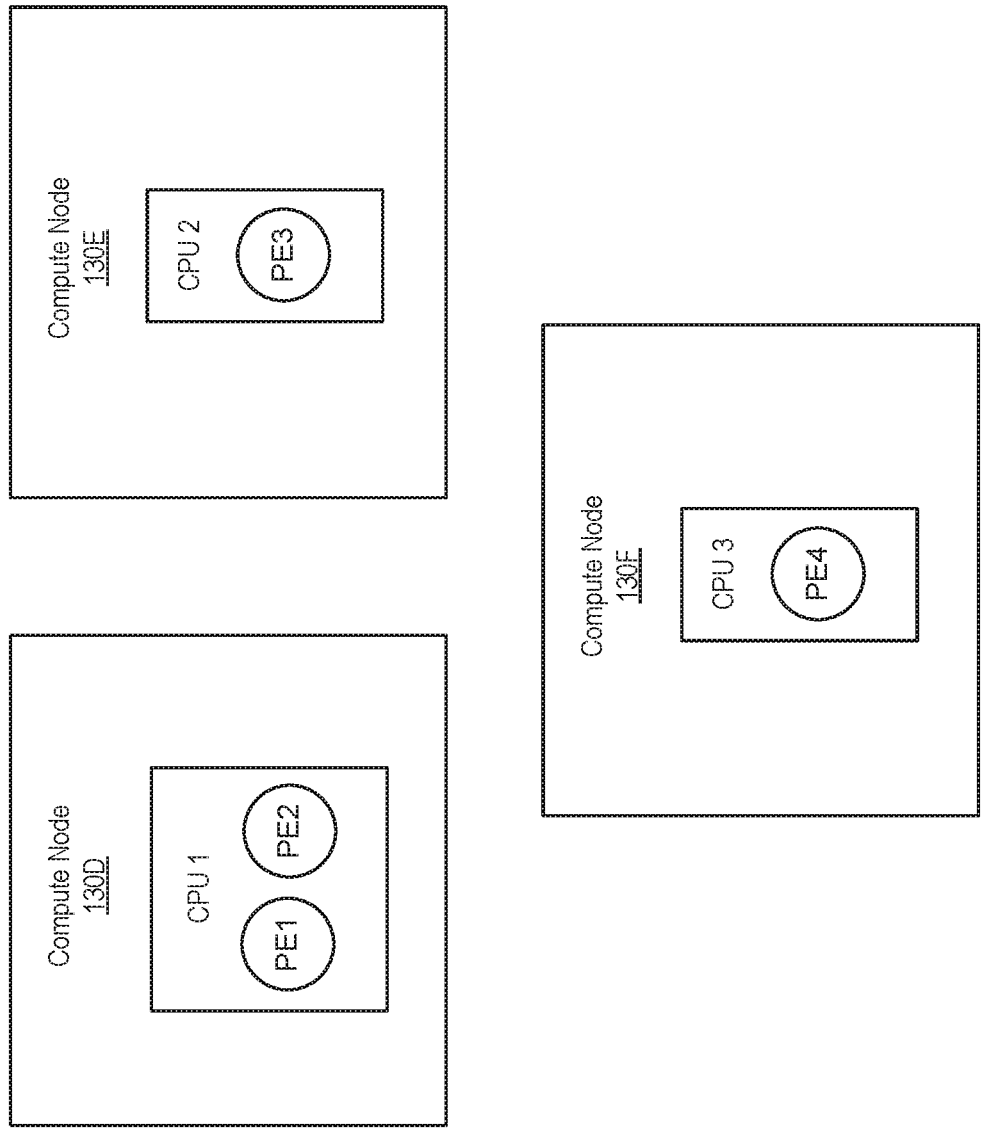

FIGS. 6A-E illustrate examples of determining processing element deployment placement in a dynamic manner, according to embodiments. FIGS. 6A-B illustrate grouping PEs on compute nodes based on execution profiling of the PEs' code. As used herein, "profiling" refers to running code and determining what lines of code are executed and/or what resources are used during the execution of the code. In some embodiments, profiling may be used to determine performance metrics associated with code, such as classes that need to be loaded, instructions that need to be loaded, cycles per instruction (CPI) associated with PEs, etc., and the code may then be deployed based on such performance metrics. FIG. 6A illustrates an example in which profiling is performed to group PEs in a manner that minimizes class loading. The loading time of classes, such as classes in Java code, can be substantial. It is generally beneficial to load a class to as few compute nodes as possible (e.g., to only a single compute node) in order to reduce the loading time and memory footprint. In one embodiment, a developer may minimize class loading by using the IDE application 142 to add the following line to the end of code for PE(s): "config placement: hostColocation("someHostColocationId") type (class_loading);". In this line of code, (1) "someHostColocationId" is an identifier of a compute node, or a set of compute nodes, on which PEs that are tagged with this same identifier should run, and (2) "type(class_loading)" specifies that within the compute node or set of compute nodes identified by "someHostColocationId," the deployment of the PE(s) should minimize the loading of classes. When code of such PE(s) (and other code of the distributed stream computing application) is compiled, the compiler 144 may generate executable code as well as associated instructions specifying how to deploy the executable code, among other things. As described, code written in Streams Processing Language (SPL), which is a distributed data flow composition language used in IBM® Streams, is typically compiled to create a SAB file containing separate files that include the compiled executable code and instructions on how to deploy the code, and the deployment component 136 of the stream manager 134 is configured to read such a file that includes instructions and take appropriate actions to deploy code based on those instructions.

In particular, the instructions generated based on the "config placement: hostColocation("someHostColocationId") type(class_loading);" line of code may indicate that the deployment component 136 of the stream manager 134 should deploy the PE(s) associated with this line of code in groupings that minimize the loading of classes on different compute nodes. That is, a rule to minimize class loading is added to the instructions by the compiler 144 in response to this line of code, and the deployment component 136 may follow such instructions by attempting to minimize the loading of classes during deployment. In such a case, the deployment component 136 may perform code execution profiling by executing the code in a test environment and determining classes that are loaded during such an execution. Thereafter, the deployment component 136 may place PEs on compute nodes so as to minimize loading of classes on different compute nodes. For example, if "someHostColocationId" identifies 4 compute node instances and a stream computing application includes 12 Java PEs, the deployment component 136 may, in accordance with instruction(s) to minimize the loading of classes, profile the execution of the Java PEs and then form 4 groups of 3 PEs, in which the groups of PEs share as many Java classes as possible and are placed on respective compute nodes so as to minimize class loading. For example, if PEs 1, 2, and 3 are the only processing elements that require Java classes x, y, and z, then those PEs may be grouped together to run on one compute node. As shown in FIG. 6A, PEs 1-12 are placed across compute nodes 130A-D to minimize class loading, with PEs 1-3 being placed on compute node 130A, PEs 4-6 being placed on compute node 130B, PEs 7-9 being placed on compute node 130C, and PEs 10-12 being placed on compute node 130D.

FIG. 6B illustrates an example grouping of PEs on compute nodes based on cycles per instruction associated with the PEs. CPI is a measure of the average number of clock cycles per instruction for a program or program fragment. For example, a PE that is determined through execution profiling to have a high CPI relative to other PEs may be using a large amount of, and thrashing, the memory in a processor's cache. In such a case, it may not hurt to run such a PE associated with a relatively high CPI on the same processor as other PEs associated with relatively high CPIs. In particular, each of the PEs associated with a relatively high CPI may already cause the cache memory to be thrashed, with pages being paged in and out, so running additional high CPI PEs on the same processor may not worsen such thrashing significantly. Conversely, a PE that is determined through execution profiling to have a relatively low CPI may not be taking up much memory in a processor's cache. In one embodiment, such a PE associated with a relatively low CPI may be placed on a processor together with other PEs associated with relatively low CPIs. In one embodiment, a developer may add the following line to the end of code for PE(s) such that the compiler 146 generates instructions including a rule that specifies the PE(s) are to be deployed together based on CPI determined through execution profiling: "config placement: hostColocation("someHostColocationId") type(profiled_metric,cpi);". In this line of code, (1) "someHostColocationId" is again an identifier of a compute node, or a set of compute nodes, on which PEs that are tagged with this same identifier should run, and (2) "type(profiled_metric,cpi))" specifies that within the compute node or set of compute nodes identified by "someHostColocationId," the deployment component 136 should load the PE(s) together (or not) based on CPI determined through execution profiling. Based on the instruction or instructions generated at compile time as a result of this line of code, the deployment component 136 may perform code execution profiling by executing the code in a test environment and determining the CPIs associated with PEs, after which the deployment component 136 may collocate PEs associated with relatively high or low CPIs (e.g., the highest or lowest CPIs, or CPIs above or below a certain threshold) on the same compute node(s). As shown in FIG. 6B, deployment component 136 has determined through execution profiling that PEs 1-2 have relatively high CPIs (or relatively low CPIs), and, as a result, deployment component 136 has collocated PEs 1-2 together on compute node 130E, where the PEs 1-2 share CPU 1. As described, collocating PEs 1-2 with relatively high CPIs may not hurt performance significantly, as CPU 1's cache memory may already be thrashed by running either of PEs 1 or 2.

Figure 6C:
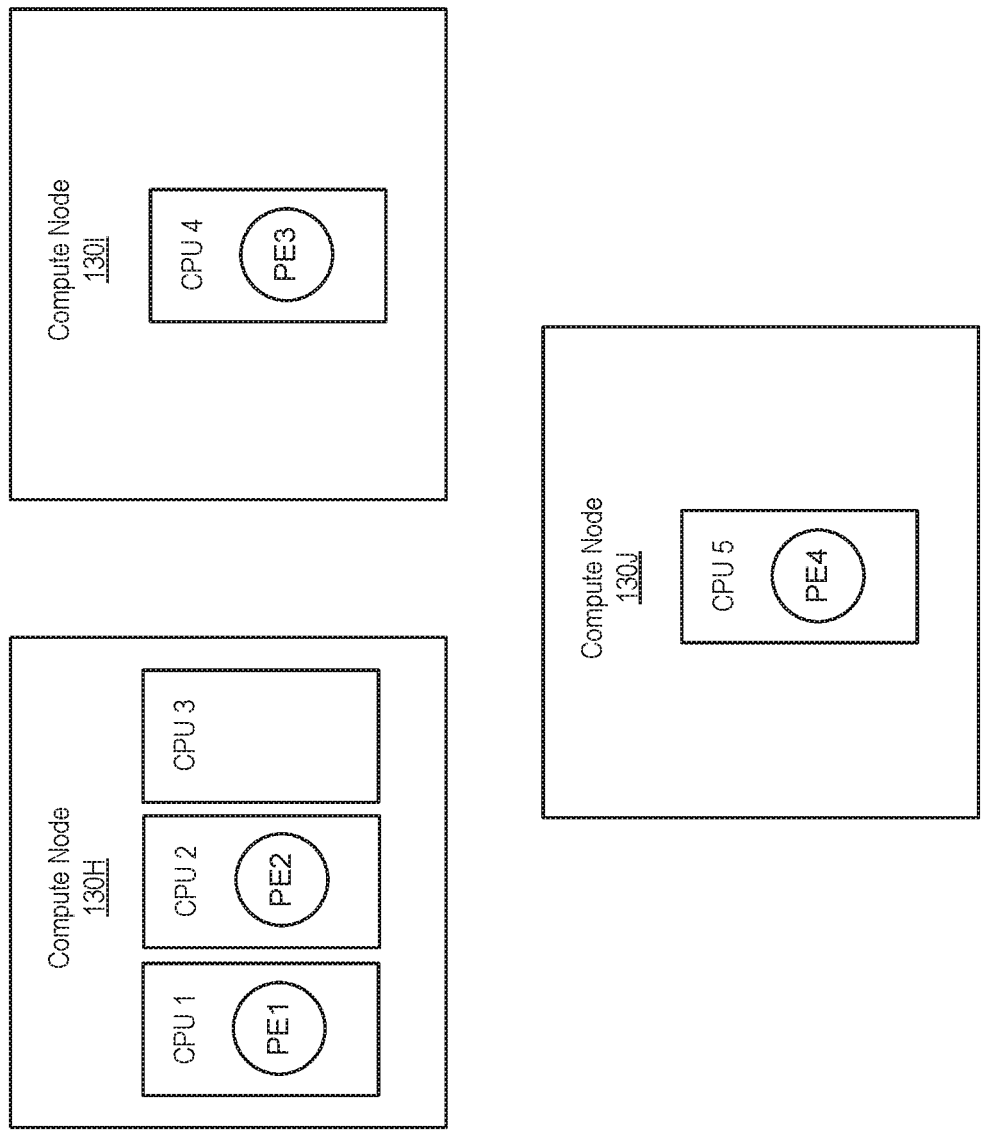

FIG. 6C illustrates an example deployment of PEs together on a compute node based on system characteristics. In particular, the system characteristic in this example is a number of processors on the compute nodes. More generally, the system characteristics used to determine PE deployment may include any hardware and/or software being installed on the compute nodes to which PEs may be deployed. In one embodiment, a developer may add the following line to the end of code for PE(s) such that the compiler 146 generates instructions including a rule that specifies the PE(s) are to be deployed together based on a number of that are installed processors on compute node(s): "config placement: hostColocation("someHostColocationId") type(system_metric,installed_#_of_processors);". In this line of code, (1) "someHostColocationId" is again an identifier of a compute node, or a set of compute nodes, on which PEs that are tagged with this same identifier should run, and (2) "type(system_metric,installed_#_ of_processors)" specifies that within the compute node or set of compute nodes identified by "someHostColocationId," the deployment component 136 should load the PE(s) together on a compute node with at least the number of processor indicated by "installed_#_of_processors." As shown in FIG. 6C, the required number of processors for the deployment of PEs 1 and 2 is three, and PEs 1 and 2 have been grouped together on compute node 130H that includes three processors CPUs 1-3.

As described, the system characteristics used to determine groupings in PE deployment placement may generally include any hardware and/or software being installed on the compute nodes to which PEs are deployed. Although illustrated with respect to a number of processors, as additional examples of deploying PEs together based on system characteristics, a developer may add the following lines to the end of code for PE(s) such that the PE(s) are deployed together (or not) based on an installed version of RPM (Red Hat Package Manager) software, system SMT (simultaneous multithreading), amount of memory, number of disk arms, and type of disk drives, respectively:

"config placement: hostColocation("someHostColocationId") type(system_metric,installed_version_of_some_rpm);",
"config placement: hostColocation("someHostColocationId") type(system_metric,installed_system_smt_value);",
"config placement: hostColocation("someHostColocationId") type(system_metric,installed_amount_of_memory);",
"config placement: hostColocation("someHostColocationId") type(system_metric,installed_number_of_disk_arms);",
"config placement: hostColocation("someHostColocationId") type(system_metric,installed_type_of_disk_drives);".

Similar to the deployment of PE(s) based on the number of processors, the deployment component 130 may determine compute nodes that satisfy these other system characteristics and then deploy the PE(s) together (or not) on one or more of the compute nodes satisfying the system characteristics.

Figure 6D:
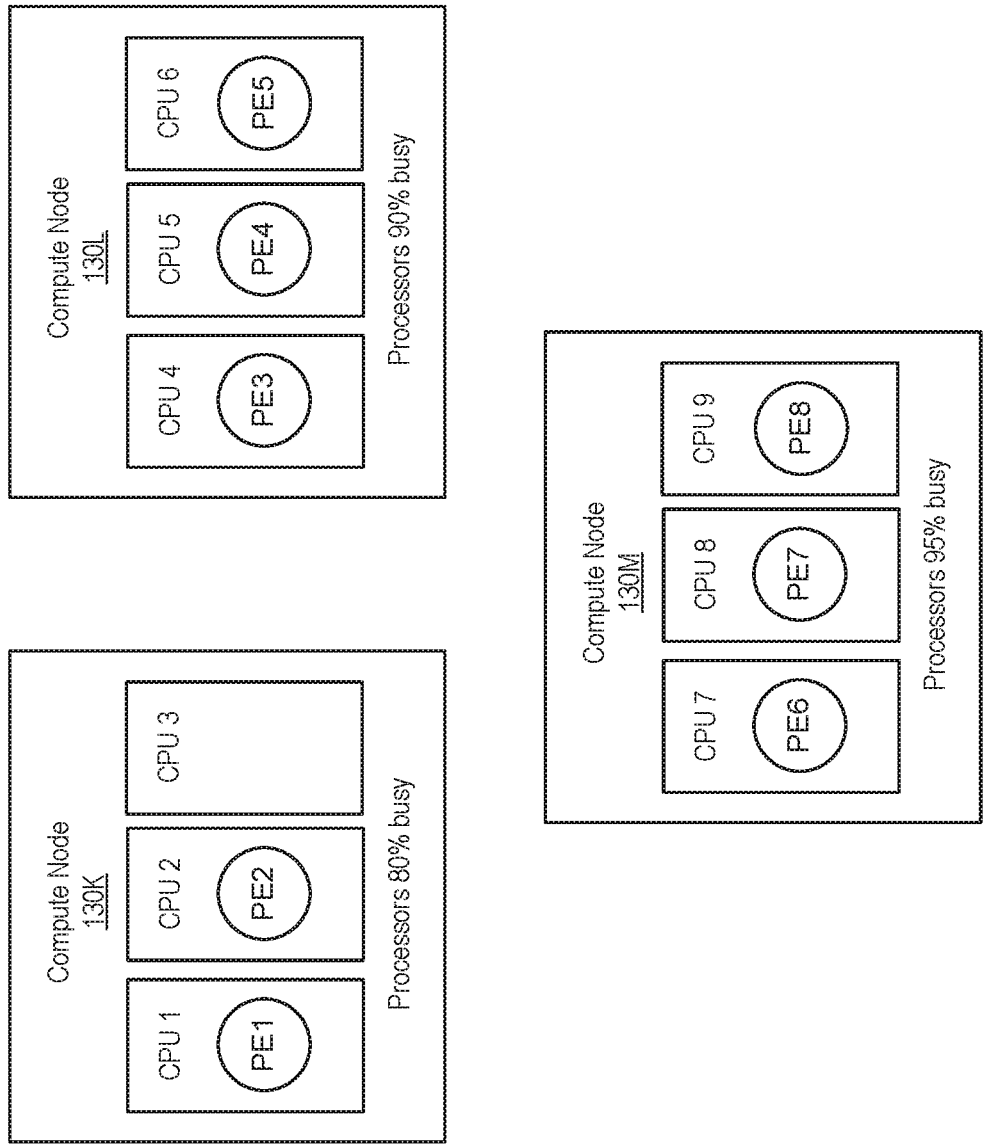

FIG. 6D illustrates an example deployment of PES together on a compute node based on a streams runtime condition. As used herein, a "streams runtime condition" refers to a condition, based on streams environment information known to the stream manager 134, that occurs during runtime. Examples of streams runtime conditions include processors of a compute node being less than a certain percent (e.g., 90%) busy, a disk drive of a compute node being less than a certain percent (e.g., 50%) busy, less than a certain number (e.g., 100) of PEs executing on a compute node, a compute node that is (or is not) running a certain type of PE (e.g., Java PEs), a compute node that utilizes certain package(s), a compute node processing less than a certain number of tuples (e.g., less than 1,000 tuples per second), etc. Although discussed herein primarily with respect to streams runtime conditions relating to entire compute nodes, such as the processors of a compute node being less than a certain percent busy, in some cases streams runtime conditions may relate to components of the compute nodes instead, such as an individual processor being less than a certain percent busy. The stream manager 134 may monitor the CPU usage of compute nodes, the disk drive usage of compute nodes, the number of PEs executing on compute nodes, the number of PEs executing on compute nodes, the types of PEs running on compute nodes, the packages used by compute nodes, the number of tuples running on compute nodes, etc. In turn, the deployment component 136 may utilize the monitored information to make deployment placements based on conditions specified in instructions associated with compiled code. In one embodiment, a developer may add the following line to the end of code for PE(s) such that the compiler 146 generates instructions including a rule that specifies the PE(s) are to be deployed together based on a streams runtime condition: "config placement: hostColocation("someHostColocationId") type(streams_runtime_condition,"");". In this line of code, (1) "someHostColocationId" is again an identifier of a compute node or set of compute nodes on which PEs that are tagged with this same identifier should run, and (2) type (streams_runtime_condition,"") specifies that within the compute node or set of compute nodes identified by "someHostColocationId," the deployment component 136 should load the PE(s) on a compute node that satisfies a streams runtime condition in quotes. As shown in FIG. 6D, the example streams runtime condition requires processors of a compute node to be less than 90% busy for the deployment of PEs 1 and 2, and, as a result, the deployment component 136 has placed PEs 1 and 2 together on compute node 130K, whose processors are 80% busy.

In addition to streams runtime conditions, deployment placement decisions to collocate and/or ex-collocate PEs may also be made based on streams metrics. Streams metrics are associated with individual PEs, as opposed to the overall streams environment, and may be monitored by the stream manager 134 along with streams runtime conditions. That is, streams metrics relate to individual PEs, whereas streams runtime conditions may consider the rest of the operator graph. Examples of streams metrics include a tuple count or tuple rate, minimum and maximum memory usage by a tuple, how many exceptions a tuple throws, how many times a tuple is redeployed, a number of tuples that are filtered, an amount of time used by a tuple, etc. For example, a deployment rule may specify that PEs associated with less than a certain tuple count or rate, such as PEs processing less than a certain number of tuples per second, should be collocated on a compute node. As another example, a tuple may be manually or automatically restarted whenever a problem with the tuple is encountered, and a deployment rule may specify that PEs associated with high tuple redeployments should be deployed together on the same compute node or on different compute nodes in order to collocate or ex-collocate the problematic PEs, as appropriate. In one embodiment, a developer may add the following line to the end of code for PE(s) such that the compiler 146 generates instructions including a rule that specifies the PE(s) are to be deployed together based on a streams runtime metric: "config placement: hostColocation ("someHostColocationId") type(streams_metric_value,"metric_name",metric_value);". In this line of code, (1) "someHostColocationId" is again an identifier of a compute node or set of compute nodes on which PEs that are tagged with this same identifier should run, and (2) "type(streams_metric_value,"metric_name",metric_value)" specifies that, within the compute node or set of compute nodes identified by "someHostColocationId," the deployment component 136 should load the PE(s) together on a compute node associated with a streams runtime metric that satisfies the value of "metric_value."

Figure 6E:
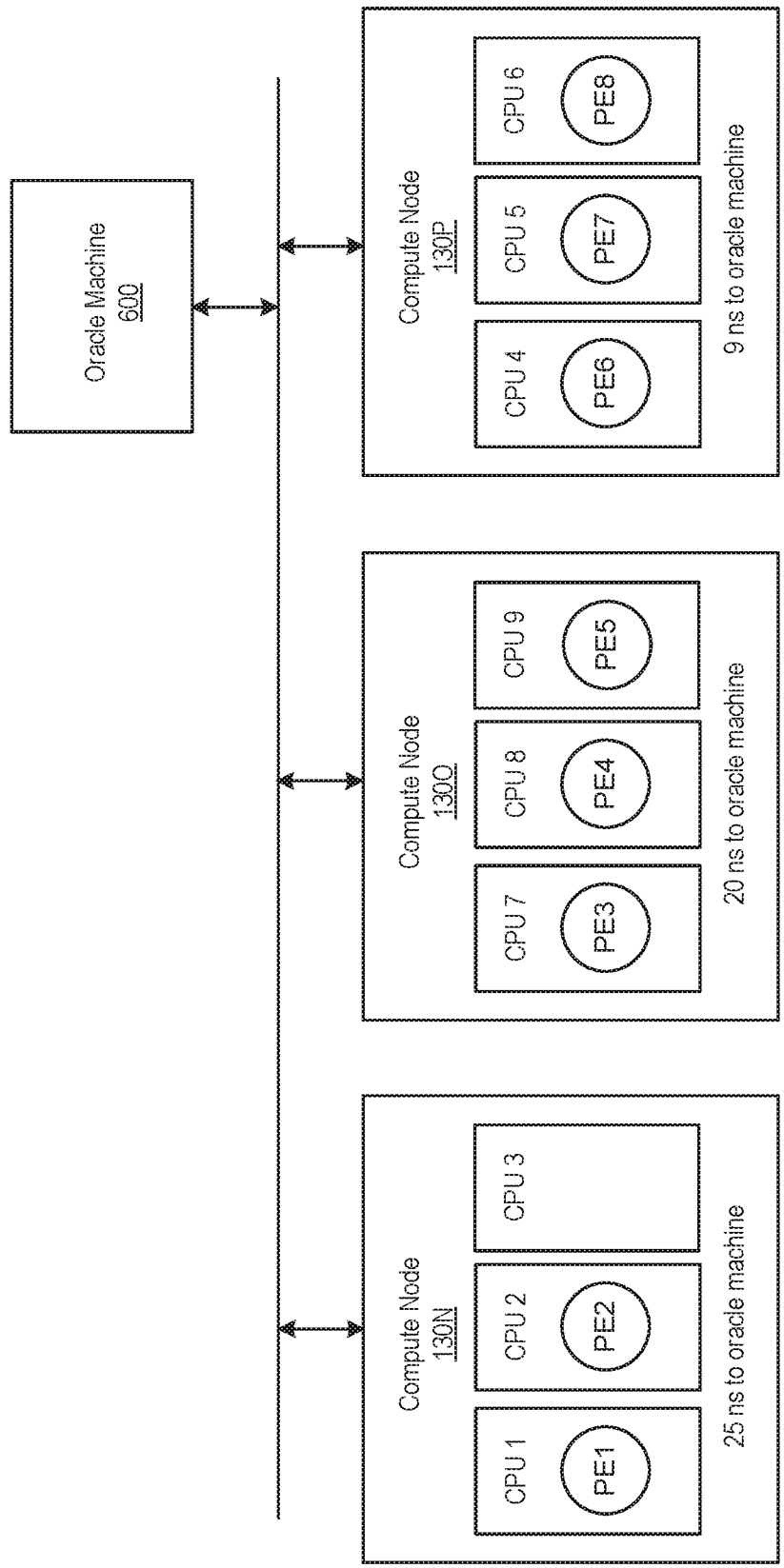

FIG. 6E illustrates an example deployment of PEs together on a compute node based on proximity to an external source. A developer may wish for particular PEs to be deployed within a certain proximity of an external source that those PE rely upon. For example, the developer may want PEs to be close in time to (e.g., within 10 nanoseconds of) a machine that runs a particular type of database, such as an oracle database or DB2 database. In one embodiment, a developer may add the following line to the end of code for PE(s) such that the compiler 146 generates instructions including a rule that specifies the PE(s) are to be deployed together based on a streams runtime condition: "config placement: hostColocation("someHostColocationId") type (with_external_source_time,oracle, 10 nanoseconds);". In this line of code, (1) "someHostColocationId" is again an identifier of a compute node or set of compute nodes on which the PE and other PEs that are tagged with the same identifier should run, and (2) "type(with_external_source_time,oracle, 10 nanoseconds)" specifies that within the compute node or set of compute nodes identified by "someHostColocationId," the deployment component 136 should load the PE(s) on a compute node that is within 10 nanoseconds of an oracle machine. FIG. 6E illustrates such a proximity requirement that PEs 6-8 must be placed on a compute node within 10 nanoseconds of an oracle machine 600. As a result, the deployment component 136 has placed PEs 6-8 together on compute node 130P, which is 8 nanoseconds from a oracle machine 600.

Although discussed above primarily with respect to individual lines of code being added to the end of code for PEs to minimize class loading, collocate PEs based on CPI of those PEs, deploy PEs based on system characteristics, etc., in one embodiment multiple rules on when to collocate and/or ex-collocate PEs may be specified in a configuration file that the compiler 146 reads to generate the instructions for deploying the PEs that include those rules. In such a case, the configuration file is a centralized place on disk where deployment placement rules are stored, and the configuration file may be used for the entire deployment of the stream computing application, without requiring a developer to add multiple lines of codes in different places. Any suitable type of configuration file may be used, such as an XML file. For example, a developer may add the following line to the end of code for PE(s) in order to specify that the rules in a configuration file should be used: "config placement: hostColocation("someHostColocationId") type(rule: rules.xml);". In this line of code, (1) "someHostColocationId" is again an identifier of a compute node or set of compute nodes on which the PEs that are tagged with the same identifier should run, and (2) "type(rule: rules.xml)" specifies that deployment placement of the PE(s) should be based on rules in a configuration file named "rules.xml."

Figure 7:
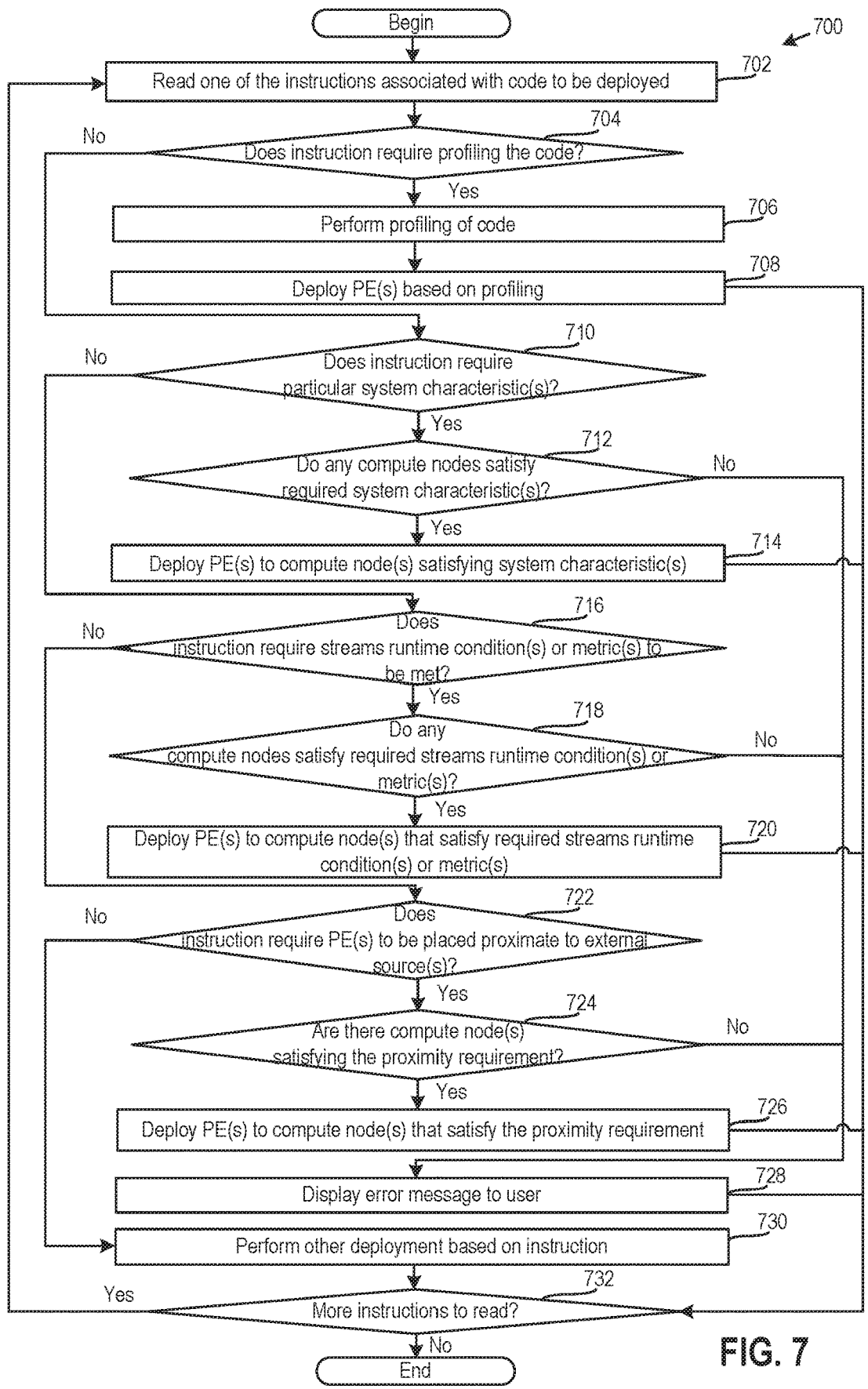
FIG. 7 illustrates a method for dynamically placing processing elements during the deployment of a stream computing application, according to an embodiment.

FIG. 7 illustrates a method 700 for dynamically placing processing elements during the deployment of a stream computing application, according to an embodiment. As shown, the method 700 begins at step 702, where the code deployment component 136 of the stream manager 134 reads one of the instructions associated with code to be deployed. As described, such instructions may be generated at compile time along with executable code and specify how to deploy the executable code, including rules for collocating PEs together on a single compute node and/or ex-collocating PEs across distinct compute nodes in a dynamic manner. At steps 704-726, the deployment component 136 determines a deployment placement for, and deploys the executable code associated with, one or more PEs based on the requirements of a deployment rule in the instruction read at step 702. In particular, the rule may require the deployment component 136 to evaluate one or more PEs themselves, the compute nodes on which the PEs can run, and/or the streams runtime, in order to determine a deployment placement for the PEs.

At step 704, if the instruction requires profiling the code, then at step 706 the deployment component 136 performs code execution profiling, and the deployment component 136 deploys PE(s) based on the profiling at step 708. As described, profiling may be used to evaluate the code itself and determine performance metrics associated with PE(s)' code, such as classes that need to be loaded, instructions that need to be loaded, CPI associated with PE(s), and so on. The instruction that is read may require code to be deployed based on such performance metrics, in which case execution profiling is performed to determine values of the performance metrics for the code. For example, the instruction may include a rule specifying that the deployment component 136 should minimize class loading, or that the deployment component 136 should place PEs associated with relatively high CPIs together, as discussed above with respect to FIGS. 6A-B, in which case the deployment component 136 may use execution profiling to determine the classes being loaded or the PEs associated with high CPIs, respectively, and then deploy PEs based on the results of such profiling. It should be noted that profiling may also reveal that certain PEs cannot be collocated during deployment, in which case deploying the PE(s) based on the profiling at step 708 may include, e.g., using a second best answer or falling back to a default way of deploying the code.

Assuming that profiling of the code to be deployed is not required, then at step 710, if the instruction requires particular system characteristic(s) for the placement of PE(s) in the code to be deployed, then the deployment component 136 determines at step 712 whether there are compute node(s) satisfying the required system characteristic(s), in which case the deployment component 136 deploys PE(s) to compute node(s) that satisfy the required system characteristic(s) at step 714. As described, the system characteristic(s) may include any hardware and/or software being installed on a compute node, and the instructions associated with code to be deployed may include rule(s) requiring certain system characteristics for deployment of the code, in which case the deployment component 136 evaluates the compute nodes to determine whether they satisfy the required system characteristics. In some embodiments, the system characteristic(s) may include a compute node having at least a certain number of processors, an amount of memory, a number of disk arms, type of disk drives, an installed version of RPM software, and/or system SMT, etc., as discussed above with respect to FIG. 6C. The deployment component 136 dynamically determines compute nodes satisfying such system characteristic(s) specified in the instruction, if any, and then deploys PE(s) associated with the instruction on compute node(s) that satisfy the specified system characteristic(s).

Assuming the instruction does not require particular system characteristics, then at step 716, if the instruction requires streams runtime condition(s) or streams metric(s) to be satisfied, then the deployment component 136 determines at step 718 whether there are compute node(s) satisfying the streams runtime condition(s) or streams metric(s), in which case the deployment component 136 deploys PE(s) to compute node(s) that satisfy the required streams runtime condition(s) or metric(s) at step 720. As described, the instructions associated with code to be deployed may include rule(s) requiring certain streams runtime condition(s) or streams metric(s) to be met, in which case the deployment component 136 evaluates the overall streams runtime or individual PEs to determine whether they satisfy the required streams runtime condition(s) or metric(s), respectively. A streams runtime condition is a condition, based on streams environment information known to the stream manager 134, that occurs during runtime, such as a compute node having processors less than a certain percent busy, a disk drive less than a certain percent busy, less than a certain number of PEs executing on a compute node, a compute node that is (or is not) running a certain type of PE, a compute node that utilizes certain package(s), a compute node processing less than a certain number of tuples etc., as discussed above with respect to FIG. 6D. A streams metric is a metric associated with individual PEs, as opposed to the overall streams environment, and examples of streams metrics include a tuple count or tuple rate, minimum and maximum memory usage by a tuple, how many exceptions a tuple throws, how many times a tuple is redeployed, a number of tuples that are filtered, an amount of time used by a tuple, etc., as discussed above with respect to FIG. 6D. The deployment component 136 dynamically determines compute nodes satisfying streams runtime condition(s) or streams metric(s) specified in the instruction, if any, and then deploys PE(s) associated with the instruction on those compute node(s) that satisfy the specified system characteristics.

Assuming the instruction does not require any streams runtime condition or metric to be met, then at step 722, if the instruction requires PE(s) to be placed in proximity to external source(s), then the deployment component 136 determines at step 724 whether there are compute node(s) satisfying the proximity requirement, in which case the deployment component 136 deploys PE(s) associated with the instruction to compute node(s) that satisfy the proximity requirement at step 726. As described, the instructions associated with code to be deployed may include rule(s) requiring compute nodes on which the code is deployed to be proximate to certain external source(s), in which case the deployment component 136 evaluates the compute nodes to determine whether they satisfy the required proximity to external source(s). For example, the external source may be an oracle machine as discussed above with respect to FIG. 6E, in which case the deployment component 136 would dynamically determine compute nodes that are within a specified proximity (e.g., 10 nanoseconds) of the oracle machine, if any, and then deploys PE(s) associated with the instruction on the determined compute node(s) satisfying the proximity requirement.

If there are no compute node(s) satisfying required system characteristic(s), required streams runtime condition(s) or metric(s), or required proximity to external source(s), then at step 728, the deployment component 136 causes an error message to be displayed to a user. For example, the error message may indicate that the stream computing application cannot be deploy and reason(s) why the deployment cannot be made. It should be noted that, although not shown, the deployment component 136 may also cause an error message to be displayed in cases where PEs cannot be deployed based on the results of code execution profiling. In another embodiment, the deployment component 136 may make the best attempt to place PEs on compute nodes satisfying the requirement(s) of the instruction within a threshold of tolerance. In such a case, the threshold of tolerance may be specified in, e.g., the source code or a configuration file, along with the deployment rules. For example, if the instruction includes a rule requiring that a PE be placed on a compute node running less than 100 PEs (which is a system characteristic), and a threshold of tolerance is specified allowing up to 20 additional PEs to be running on the same compute node, then the deployment component 136 may still place the PE on a compute node running 110 PEs, without causing an error message to be displayed, if the compute node running 110 PEs is a compute node executing the least number of PEs.

Assuming that the instruction does not require profiling of the code to be deployed, any particular system characteristics, any streams runtime condition or metrics, or proximity to external sources, then the deployment component 136 performs other deployment of PE(s) based on the instruction. Any suitable deployment may be made, depending on what the instruction requires. For example, the instruction may include a manually specified collocation or ex-collocation of PEs on particular compute nodes, which does not require deployment placement to be determined in a dynamic manner, and the deployment component 136 may deploy the PEs based on the manually specified collocation or ex-collocation.

At step 732, if there are more instructions associated with the code to be deployed, then the method 700 returns to step 702, where the deployment component 136 reads another instruction associated with the code to be deployed. Otherwise, the method 700 ends if there no more instructions associated with the code to be deployed.

Figure 8:
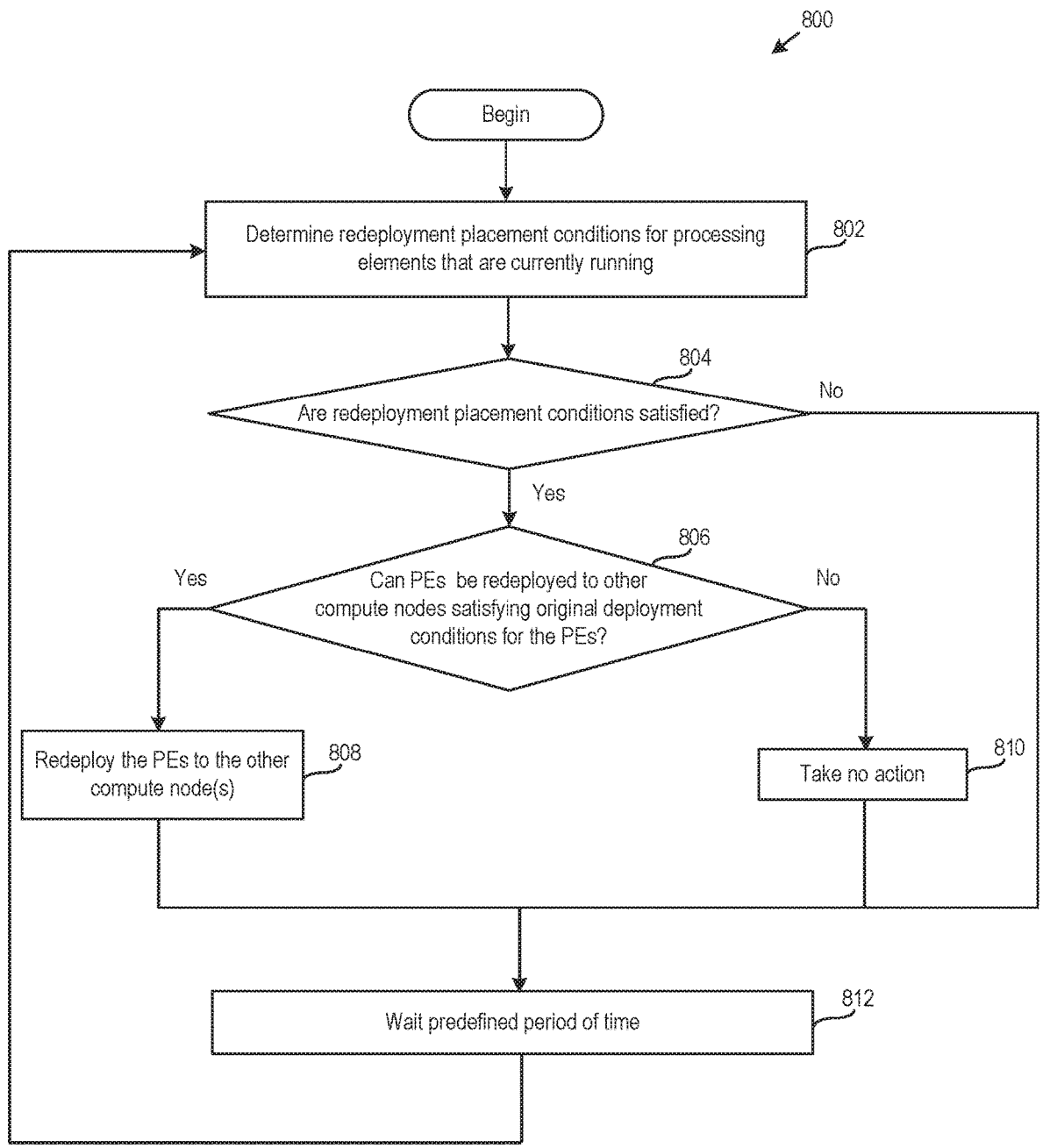
FIG. 8 illustrates a method for processing element placement redeployment, according to an embodiment.

FIG. 8 illustrates a method 800 for processing element placement redeployment, according to an embodiment. As shown, the method 800 begins at step 802, where the deployment component 136 determines redeployment placement conditions for PEs that are currently running. Similar to the initial deployment of PEs described above, the deployment component 136 may read instructions that are generated during the compiling of source code and associated with compiled executable code for the currently running PEs to determine redeployment placement conditions for those PEs. In one embodiment, the redeployment placement conditions may specify that, for redeployment, the initial deployment placement condition(s) must not be satisfied up to associated threshold(s) of tolerance. For example, the instructions may specify that a PE deployed to a compute node with less than 100 PEs running at the time should be redeployed if more than 20 (or any other threshold) of PEs greater than the original 100 PEs are currently running on the compute node. In one embodiment, the instructions may also specify whether PE redeployment is enabled or not, and, in such a case, the deployment component 136 may only determine placements for, and redeploy, PEs if the instructions indicate that PE redeployment is enabled. It should be noted that, as the instructions for dynamic deployment placement may be generated based on source code or a configuration file, a developer may specify in the source code or configuration file whether redeployment is enabled and the threshold(s) of tolerance for redeployment using, e.g., the IDE application 142.

At step 804, the deployment component 136 determines whether the redeployment placement conditions are satisfied. Returning to the example in which instructions associated with PE(s) specify that the PE(s) should be redeployed if more than 20 (or any other threshold of) PEs greater than the original 100 PEs are currently running on a compute node to which the PE(s) have been deployed, the deployment component 136 may determine whether the compute node on which the PE(s) have been deployed is running more than 120 PEs.

If redeployment placement conditions are satisfied, then the deployment component 136 attempts to redeploy PE(s) associated with the redeployment conditions that are satisfied. In particular, the deployment component 136 determines at step 806 whether the PE(s) that should be redeployed (i.e., the PEs associated with redeployment conditions that are satisfied) can be redeployed to any other compute nodes satisfying the original deployment conditions for those PE(s). Returning to the example in which the original deployment condition required PE(s) to be deployed on a compute node running less than 100 PEs and the threshold for redeployment was 20 PEs more than the original 100 PEs, the deployment component 136 may determine whether the PE(s) can be redeployed together on another compute node that is currently running less than 100 PEs. In an alternative embodiment, the deployment component 136 may determine whether the original deployment conditions can be satisfied up to associated threshold(s) of tolerance.

If the PE(s) can be redeployed to other compute node(s) satisfying the original deployment conditions for the PEs (or the original deployment conditions up to associated threshold(s) of tolerance in another embodiment), then at step 808, the deployment component 136 redeploys the PE(s) to the other compute node(s) by, e.g., copying and running the executable code of the PE(s) on the other compute node(s) while stopping execution of the PE(s) on the compute node(s) that were previously running those compute nodes. It should be understood that if there are multiple other compute node(s) satisfying the original deployment conditions for the PE(s), then the deployment component 136 may select among those compute node(s) before redeploying the PEs to the selected compute node(s).

On the other hand, if the PEs cannot be redeployed to other compute node(s) satisfying the original deployment conditions for the PEs (or the original deployment conditions up to associated threshold(s) of tolerance in another embodiment), then at step 810, the deployment component 136 takes no action. In an alternative embodiment, the PE(s) may be redeployed to other compute node(s) satisfying the original deployment conditions for the PE(s) up to associated threshold(s) of tolerance. In yet another embodiment, the deployment component 136 may cause an error message to be displayed to a user via a display device.

At step 812, the deployment component 136 waits for a predefined period of time before the method 800 returns to step 804, where the deployment component 136 again determines whether the placement conditions for the running PEs are satisfied up to associated threshold(s) of tolerance. That is, the deployment component 136 periodically checks whether the placement conditions for deploying the PEs that are running are still satisfied, and redeploys the PEs as appropriate if the placement conditions are no longer satisfied (up to, e.g., a threshold).

Advantageously, techniques disclosed herein group processing elements of a distributed stream computing application across compute nodes in a dynamic manner. Doing so can provide performance improvements over manually specified groupings of PEs on compute nodes. In particular, a stream manager may profile code and deploy (or redeploy) PEs together on compute nodes based on such profiling, deploy (or redeploy) PEs together on compute nodes meeting predefined system characteristics, deploy (or redeploy) PEs on compute nodes meeting predefined streams runtime conditions or streams metrics, and/or deploy (or redeploy) particular PEs together on compute nodes that are within a predefined proximity of an external source. In some embodiments the stream manager may fuse multiple PEs into a single PE running on a compute node, rather than running multiple collocated PEs on a compute node, based on the similar code execution profiling, system characteristics, streams runtime conditions or metrics, and/or proximity to an external source.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the foregoing features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the foregoing aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for deploying a stream computing application including a plurality of processing elements, the computer-implemented method comprising:
   profiling an execution of the plurality of processing elements of the stream computing application in a test environment to determine a class loaded for each of the plurality of processing elements, the stream computing application having an operator graph that specifies a flow of data tuples among the plurality of processing elements;
   determining at least one of a runtime metric of each of the plurality of processing elements and a system characteristic of each of a plurality of compute nodes;
   determining a network proximity of each of the plurality of compute nodes to a data source external to the stream computing application;
   determining, by operation of one or more computer processors, a plurality of groupings of the plurality of processing elements on the plurality of compute nodes based on at least three criteria selected from the class loaded, the runtime metric, the system characteristic, and the network proximity; and
   subsequent to deploying the plurality of processing elements to the plurality of compute nodes for execution based on the plurality of groupings, redeploying the at least one processing element to a different compute node upon determining that at least one criterion has changed.

2. The computer-implemented method of claim 1, wherein the plurality of groupings minimize loading of at least one class on different compute nodes.

3. The computer-implemented method of claim 2, wherein the profiling includes executing code associated with the plurality of processing elements in the test environment and determining the class during the executing of the code.

4. The computer-implemented method of claim 1, wherein the plurality of groupings includes a grouping of processing elements associated with relatively high, or relatively low, cycles per instruction on one of the plurality of compute nodes.

5. The computer-implemented method of claim 4, wherein the profiling includes executing code associated with the plurality of processing elements in the test environment and determining cycles per instruction associated with the plurality of processing elements during the executing of the code.

6. The computer-implemented method of claim 1, wherein the plurality of groupings is determined based on one or more rules specified in instructions, wherein the instructions are generated based at least in part on one or more lines of a source code or a configuration file.

7. The computer-implemented method of claim 1, further comprising:
   determining that the at least one criterion that has changed no longer satisfies at least one condition in the one or more rules up to one or more associated thresholds of tolerance.

8. The computer-implemented method of claim 1, wherein each of the plurality of groupings is a collocation of multiple processing elements on one of the plurality of compute nodes or a fusing of multiple processing elements into a single processing element.

9. A non-transitory computer-readable medium storing a program executable to perform operations for deploying a stream computing application including a plurality of processing elements, the operations comprising:
   profiling an execution of the plurality of processing elements of the stream computing application in a test environment to determine a class loaded for each of the plurality of processing elements, the stream computing application having an operator graph that specifies a flow of data tuples among the plurality of processing elements;
   determining at least one of a runtime metric of each of the plurality of processing elements and a system characteristic of each of a plurality of compute nodes;
   determining a network proximity of each of the plurality of compute nodes to a data source external to the stream computing application;
   determining, by one or more computer processors when executing the program, a plurality of groupings of the plurality of processing elements on the plurality of compute nodes based on at least three criteria selected from the class loaded, the runtime metric, the system characteristic, and the network proximity; and
   subsequent to deploying the plurality of processing elements to the plurality of compute nodes for execution based on the plurality of groupings, redeploying the at least one processing element to a different compute node upon determining that at least one criterion has changed.

10. The non-transitory computer-readable medium of claim 9, wherein the plurality of groupings minimize loading of at least one class on different compute nodes;
   wherein the profiling includes executing code associated with the plurality of processing elements in the test environment and determining the class during the executing of the code.

11. The non-transitory computer-readable medium of claim 9, wherein the plurality of groupings includes a grouping of processing elements associated with relatively high, or relatively low, cycles per instruction on one of the plurality of compute nodes;

wherein the profiling includes executing code associated with the plurality of processing elements in the test environment and determining cycles per instruction associated with the plurality of processing elements during the executing of the code.

12. The non-transitory computer-readable medium of claim 9, wherein the plurality of groupings is determined based on one or more rules are specified in instructions, wherein the instructions are generated based at least in part on one or more lines of a source code or a configuration file.

13. The non-transitory computer-readable medium of claim 9, the operations further comprising:

determining that the at least one criterion that has changed no longer satisfies at least one condition in the one or more rules up to one or more associated thresholds of tolerance.

14. The non-transitory computer-readable medium of claim 9, wherein each of the plurality of groupings is a collocation of multiple processing elements on one of the plurality of compute nodes or a fusing of multiple processing elements into a single processing element.

15. A computer-implemented method for deploying a stream computing application including a plurality of processing elements, the computer-implemented method comprising:

determining a class loaded for each of the plurality of compute nodes, the stream computing application having an operator graph that specifies a flow of data tuples among the plurality of processing elements;

determining at least one of a runtime metric of each of the plurality of processing elements and a system characteristic of each of a plurality of compute nodes;

determining a network proximity of each of the plurality of compute nodes to a data source external to the stream computing application;

determining, by operation of one or more computer processors, a plurality of groupings of the plurality of processing elements on the plurality of the compute nodes based on at least three criteria selected from the class loaded, the runtime metric, the system characteristic, and the network proximity; and subsequent to deploying the plurality of processing elements to the plurality of compute nodes for execution based on the plurality of groupings, redeploying the at least one processing element to a different compute node upon determining that at least one criterion has changed.

16. The computer-implemented method of claim 15, further comprising:

determining whether at least one of predefined hardware or software is installed on each of the plurality of compute nodes, wherein the at least one of predefined hardware or software includes at least one of a predefined number of processors, amount of memory, type of disk drives, number of disk arms, type of software, or version of software;

wherein the plurality of groupings includes a grouping of processing elements on one of the plurality of compute nodes on which the at least one of predefined hardware or software is installed.

17. The computer-implemented method of claim 16, wherein the runtime metric comprises at least one of a predefined streams runtime condition and a predefined streams metric, wherein the plurality of groupings of processing elements includes a grouping of processing elements on one of the plurality of compute nodes on which the runtime metric is satisfied.

18. The computer-implemented method of claim 17, wherein the predefined streams runtime condition requires processors or a disk drive of a compute node to be less than a predefined percent busy, less than a predefined number of processing elements to be executing on a compute node, a compute node to run a predefined type of processing element, a compute node to utilize a predefined package, and a compute node to process less than a predefined number of tuples.

19. The computer-implemented method of claim 18, wherein the predefined streams metric includes at least one of a tuple count or rate, a minimum memory usage by a tuple, a maximum memory usage by a tuple, a number of exceptions a tuple throws, a number of times a tuple is redeployed, a number of tuples that are filtered, and an amount of time used by a tuple.

20. The computer-implemented method of claim 19, wherein the plurality of groupings includes a grouping of processing elements on one of the plurality of compute nodes that is within the network proximity to the data source.

\* \* \* \* \*